United States Patent

(12) United States Patent
Harase et al.

(10) Patent No.: US 8,145,386 B2
(45) Date of Patent: Mar. 27, 2012

(54) ACTIVATION APPARATUS FOR OCCUPANT PROTECTION SYSTEM

(75) Inventors: Shinichi Harase, Tokyo (JP); Toshiyuki Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 12/446,358

(22) PCT Filed: Aug. 10, 2007

(86) PCT No.: PCT/JP2007/065757
§ 371 (c)(1),
(2), (4) Date: Apr. 20, 2009

(87) PCT Pub. No.: WO2008/059644
PCT Pub. Date: May 22, 2008

(65) Prior Publication Data
US 2011/0004377 A1   Jan. 6, 2011

(30) Foreign Application Priority Data

Nov. 14, 2006   (JP) ................................. 2006-308107

(51) Int. Cl.
*B60R 21/013*   (2006.01)
*B60R 22/48*   (2006.01)

(52) U.S. Cl. .......... 701/45; 180/268; 180/274; 180/282; 280/735

(58) Field of Classification Search .................. 180/268, 180/274, 281, 282, 286; 280/730.2, 734, 280/735, 806; 701/45–47
See application file for complete search history.

(56) References Cited

U.S. PATENT DOCUMENTS

| | | | | |
|---|---|---|---|---|
| 5,544,915 A * | 8/1996 | Fendt et al. | | 280/735 |
| 5,758,899 A * | 6/1998 | Foo et al. | | 280/730.2 |
| 5,892,435 A * | 4/1999 | Buchheim et al. | | 340/438 |
| 5,904,723 A * | 5/1999 | Kiribayashi et al. | | 701/45 |
| 5,995,892 A | 11/1999 | Kiribayashi et al. | | |
| 6,115,659 A * | 9/2000 | Buchheim et al. | | 701/45 |
| 6,324,454 B1 * | 11/2001 | Obata et al. | | 701/45 |
| 6,917,866 B2 | 7/2005 | Grotendiek et al. | | |
| 6,978,200 B2 * | 12/2005 | Ide et al. | | 701/45 |
| 6,981,565 B2 * | 1/2006 | Gleacher | | 180/282 |
| 7,281,599 B2 * | 10/2007 | Takeuchi et al. | | 180/274 |
| 7,643,919 B2 * | 1/2010 | Nicaise | | 701/45 |
| 7,702,440 B2 * | 4/2010 | Wu et al. | | 701/45 |
| 2004/0199317 A1 | 10/2004 | Ogata et al. | | |

FOREIGN PATENT DOCUMENTS

| | | |
|---|---|---|
| DE | 199 09 296 A1 | 9/2000 |
| DE | 101 08 848 A1 | 9/2001 |
| DE | 101 03 661 C1 | 8/2002 |
| DE | 101 19 781 C1 | 8/2002 |
| DE | 101 19 621 A1 | 10/2002 |
| JP | 10-86787 A | 4/1998 |
| JP | 2004-256024 A | 9/2004 |
| JP | 2006-513093 A | 4/2006 |

* cited by examiner

*Primary Examiner* — Paul N Dickson
*Assistant Examiner* — Laura Freedman
(74) *Attorney, Agent, or Firm* — Birch, Stewart, Kolasch & Birch, LLP

(57) ABSTRACT

An activation apparatus for an occupant protection system includes acceleration sensors which are disposed on the respective right and left sides of a vehicle with respect to the center of the vehicle on the vehicle and each of which is provided for detecting the acceleration from the side opposite to the side where the sensor is disposed, and includes a determiner that determines whether or not an occupant protection system is to be activated by comparing the physical quantity computed based on the value detected and outputted by the acceleration sensor with a threshold for activating the occupant protection system.

7 Claims, 5 Drawing Sheets

(a)

(b)

ACTIVATION APPARATUS FOR OCCUPANT PROTECTION SYSTEM

TECHNICAL FIELD

The present invention relates to an activation apparatus for an occupant protection system which detects the possibility of a rollover event of a vehicle and activates an occupant protection system such as side airbag.

BACKGROUND ART

In recent years, in addition to protection means against the front collision of a vehicle, an equipment has been made popular, which activates an occupant protection apparatus disposed on the lateral side of a vehicle where a collision occurs by detecting the acceleration generated in the lateral direction of the vehicle by using a side impact sensor (acceleration sensor). Besides, measures against an accident by the overturn of a vehicle (it is called "rollover") also have been raised. Among rollover events of a vehicle, there occur a large number of accidents called "curb trip": when a vehicle is driven at a high speed and cannot be sufficiently slowed down before a curve, the vehicle skids by the centrifugal force, and trips on an obstacle such as a curbstone to be led to overturn. The curb trip causes an acceleration G and a deceleration (velocity change) ΔV to be generated in the vehicle in a lateral direction (Y-axis direction) when the vehicle comes in contact with the obstacle. Thus, since the risk that the occupant can be thrown out of the vehicle is enhanced, it is required that the occupant protection system be activated as soon as possible.

The following related art is disclosed for measures against a curb trip:

An angular velocity sensor detecting the roll angular velocity of a vehicle is provided, the roll angle of the vehicle is calculated by integrating the roll angular velocity, the presence or absence of the possibility of the occurrence of the rollover of the vehicle is determined based on the value representative of the roll angle and the value representative of the roll angular velocity, and a determination is made based on the determination result whether or not the side occupant protection system mounted on the no-collision side of the vehicle is activated (see, e.g., Patent Document 1). However, in the related art, at an initial stage where the vehicle skids and the wheel on either of the right and left sides of the vehicle collides with a curbstone or the like, the generated lateral acceleration is detected with a side impact sensor, and the occupant protection system mounted on the collision-side is quickly activated. Further, the subsequent rollover is dealt with by using the angular velocity sensor as mentioned above.
Patent Document 1: JP-A-2004-256024

In the prior art activation apparatus for the occupant protection system providing measures against a curb trip is arranged as the above; however, there are the following problems.

When a side impact sensor is disposed on a member on the collision side of a vehicle so that the impact can be directly applied thereto upon a side impact, the impact is excessively inputted thereto in a collision mode where the side member is heavily deformed. At the same time, a comparatively large impact is inputted also with respect to a low-speed side-impact requiring no activation of the occupant protection system. Further, a large shock is inputted even when the door is strongly closed. For this reason, it is necessary that the threshold be held in a large value of a level such that the occupant protection system can be not accidentally activated.

By contrast, there is the following problem with respect to the case that the shock is delivered to the wheel portion of a vehicle such as curb trip: A large impact is not inputted to the side impact sensor disposed on the side member of the vehicle; thus, it is difficult to activate the occupant protection system at a proper timing even when an angle sensor or an angular acceleration sensor is used together therewith.

The present invention has been made to solve the above-mentioned problems, and an object of the present invention is to provide an activation apparatus for an occupant protection system enabling activation of an occupant protection system at an appropriate timing, even in the case where an impact is delivered to the wheel portion of a vehicle such as curb trip by setting a threshold with respect to the outputs from an acceleration sensor disposed on the side of a low-speed side-impact and/or a non-collision where a shock upon closing the door strongly is comparatively weak.

DISCLOSURE OF THE INVENTION

The activation apparatus for an occupant protection system according to the present invention includes: acceleration sensors which are disposed on the respective right and left sides of a vehicle with respect to the center thereof on the vehicle and each of which is provided for detecting the acceleration from the side opposite to the location of the sensor, and a determining unit determining whether or not an occupant protection system is to be activated by comparing a physical quantity computed based on the value detected and outputted by the acceleration sensor with a threshold for activating the occupant protection system.

According to the invention, since a determination threshold is set with respect to the value detected and outputted by the acceleration sensor disposed on the side of a low-speed side-impact, a non-collision where a shock upon closing the door strongly is comparatively weak, or the like, the activation apparatus enables to work the occupant protection system at an appropriate timing even in the case where an impact is delivered to the wheel portion of a vehicle such as curb trip.

BEST MODE FOR CARRYING OUT THE INVENTION

Embodiments of the present invention will now be described with reference to the accompanying drawings in order to explain the present invention in more detail.

First Embodiment

Figure 5:
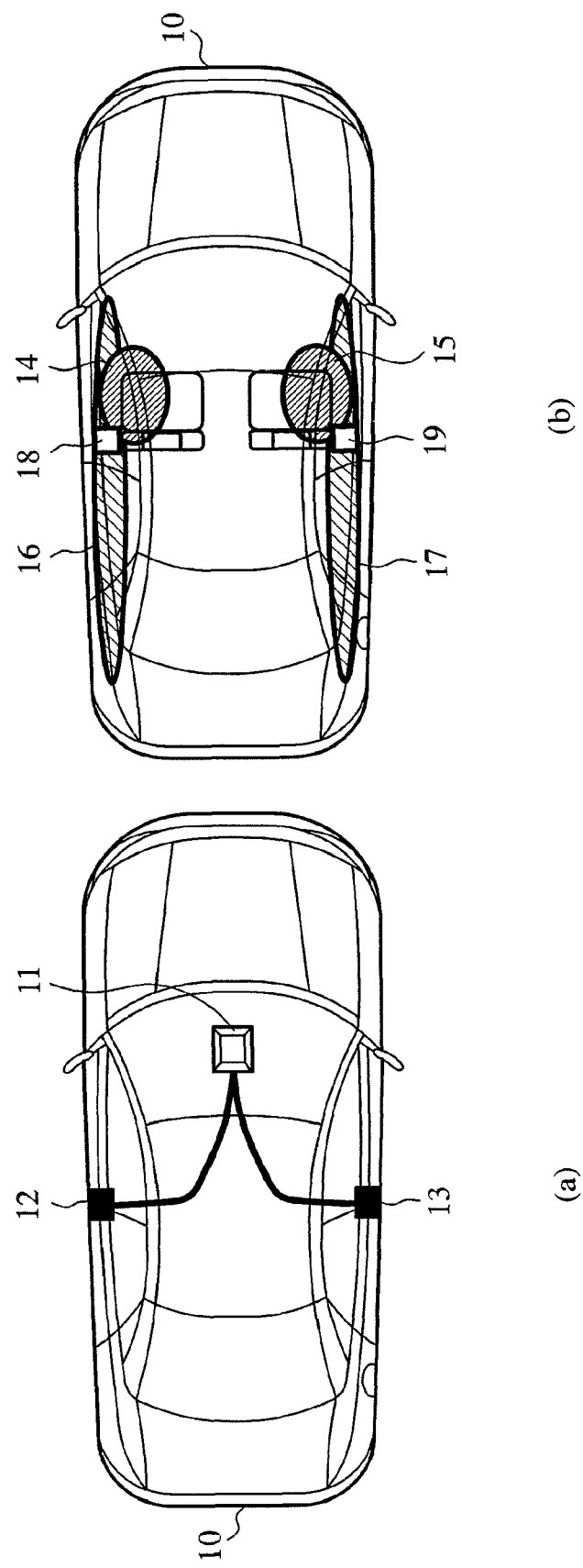
FIG. 5 illustrates explanatory views of vehicles where a side impact sensor, an occupant protection system and so on according to a prior art and the invention are disposed.

FIG. 5 illustrates explanatory views of vehicles where a side impact sensor and an occupant protection system of a prior art and the present invention are disposed.

As shown in FIG. 5(a), a main ECU (Electric Control Unit, hereinlater referred to as a "control unit") 11 is disposed near the central portion of a vehicle 10, a pair of right and left side-impact sensors 12, 13 each detecting the acceleration in the lateral direction are disposed at the pillars on the right and left sides of the vehicle, respectively. Note that there may also be side impact sensors disposed on both sides at the rear depending on the size and type of a vehicle. Further, as shown in FIG. 5(b), occupant protection apparatuses such as side airbags 14, 15, curtain airbags 16, 17, seatbelt pretensioners 18, 19, and so on are provided on the right and left sides within the vehicle 10. These occupant protection apparatuses, when they each receive a working signal from the control unit 11, are deployed and worked to be in a well-known protection form.

Figure 1:
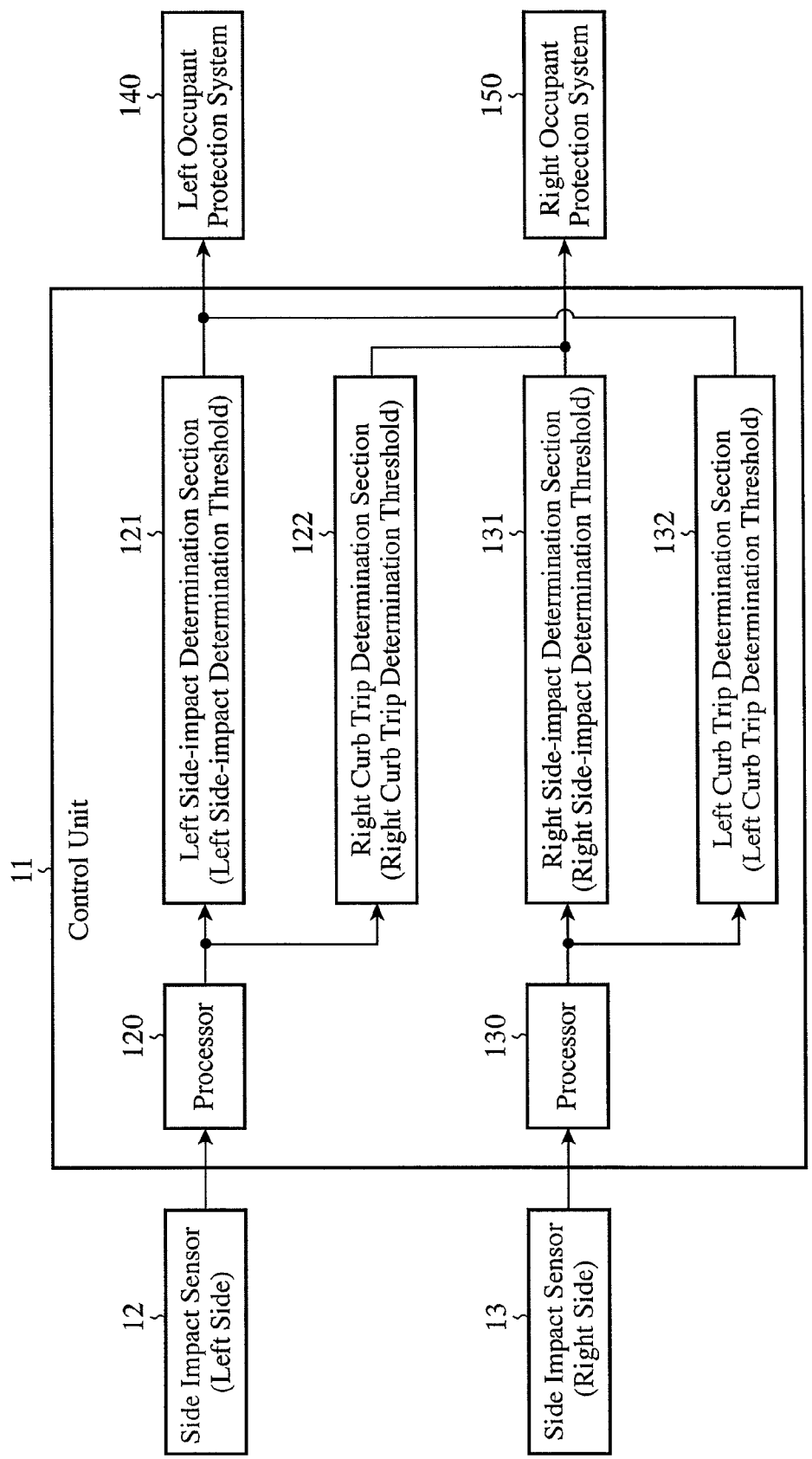
FIG. 1 is a block diagram illustrating a functional configuration of an activation apparatus for an occupant protection system in accordance with a first embodiment of the present invention.

FIG. 1 is a block diagram illustrating the functional configuration of an activation apparatus for an occupant protection system in accordance with a first embodiment of the invention.

In the drawing, the control unit 11 includes a processor 120, a left side-impact determination section 121, and a right curb trip determination section 122 as a system for processing the value detected and outputted by the left side-impact sensor 12. Further, the control unit includes a processor 130, a right side-impact determination section 131, and a left curb trip determination section 132 as a system for processing the value detected and outputted by the right side-impact sensor 13. It is assumed that the working signals outputted from the left side-impact determination section 121 and the left curb trip determination section 132 are supplied to a left occupant protection system 140, and that the working signals outputted by the right side side-impact determination section 131 and the right curb trip determination section 122 are supplied to a right occupant protection system 150.

Figure 2:
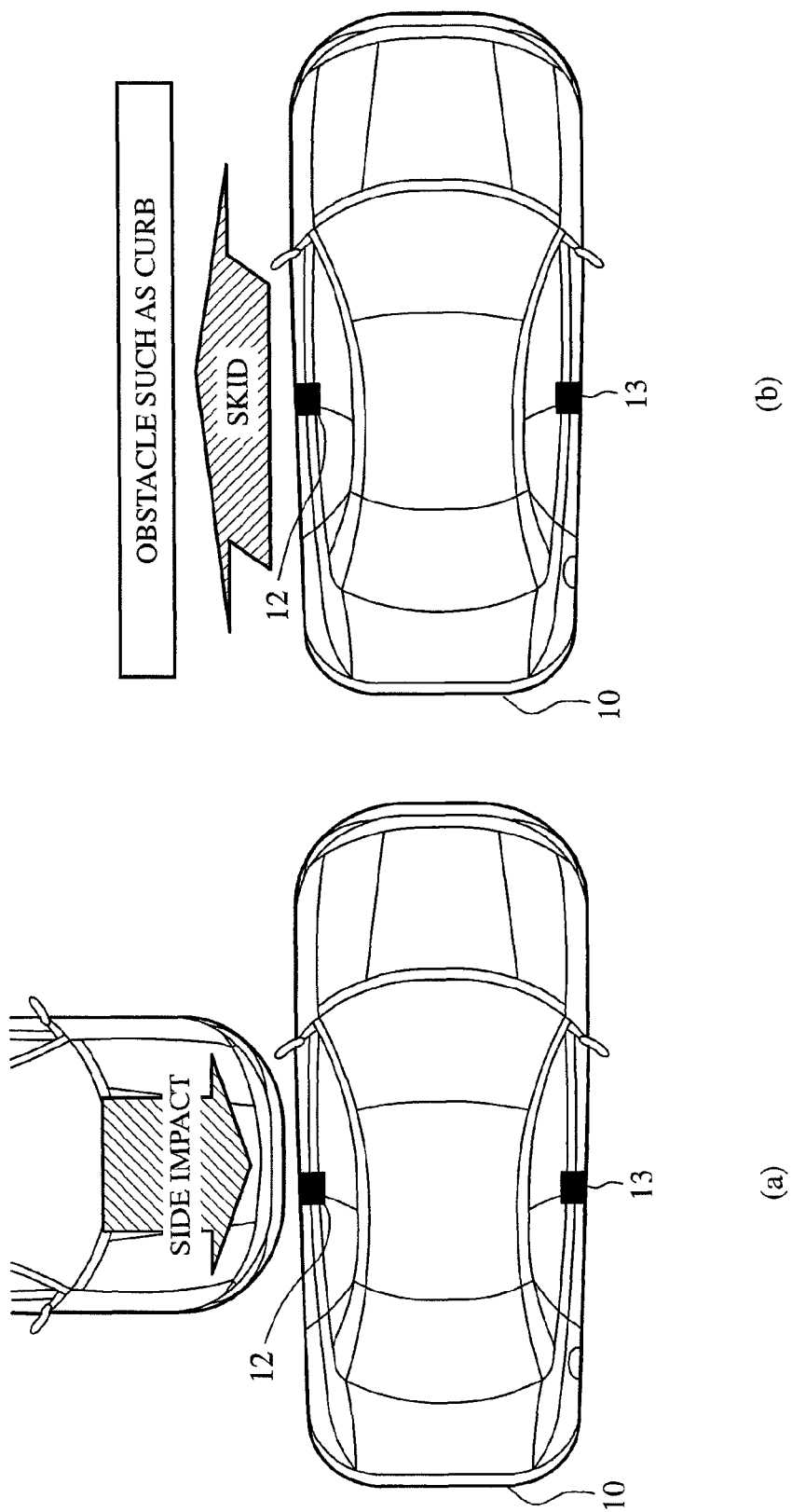
FIG. 2 illustrates explanatory views of the situations immediately before a side impact collision and a curb trip.

FIG. 2 illustrates explanatory views of the situations immediately before a side impact and a curb trip occur. FIG. 2(a) shows the case where a vehicle is just about to be hit by another vehicle coming from the left side on its left side surface, and the resulting side-impact collision is determined from the value detected and outputted by the side impact sensor 12 provided on the left side, similarly to the conventional. FIG. 2(b) shows the case where a vehicle is on the point of causing a curb trip, that is, the vehicle skids, trips over an obstacle such as a curb, and then overturns jumping the obstacle, and the collision with the obstacle is detected by using the left side-impact sensor 12 and the right side-impact sensor 13; however, according to the present invention, a judgment is made whether or not the curb trip occurs from the value detected and outputted by the right side-impact sensor 13 by processing in the control unit 11 as described later.

With respect to the side impact sensors installed in the vehicle, there are many cases that the detection level on the collision side is different from that on the non-collision side. However, when a vehicle comes into collision with an obstacle such as a curb causing a curb trip, the detection value is the acceleration G and the velocity change ΔV arising from the velocity change of the vehicle, and further, the vehicle collides with the obstacle directly on its wheel due to the small height of the obstacle. Thus, the impact is transmitted to the opposite side with a low attenuation. To be specific, the side impact sensor disposed on the non-collision side detects an acceleration G that is approximately equal in magnitude to that detected by the side impact sensor disposed on the collision side. Moreover, the polarities of the values detected by the side impact sensors disposed on the collision and non-collision sides are in an opposite relation to each other. The present invention performs protection operation against a curb trip based on such characteristics of the detection value.

Figure 3:
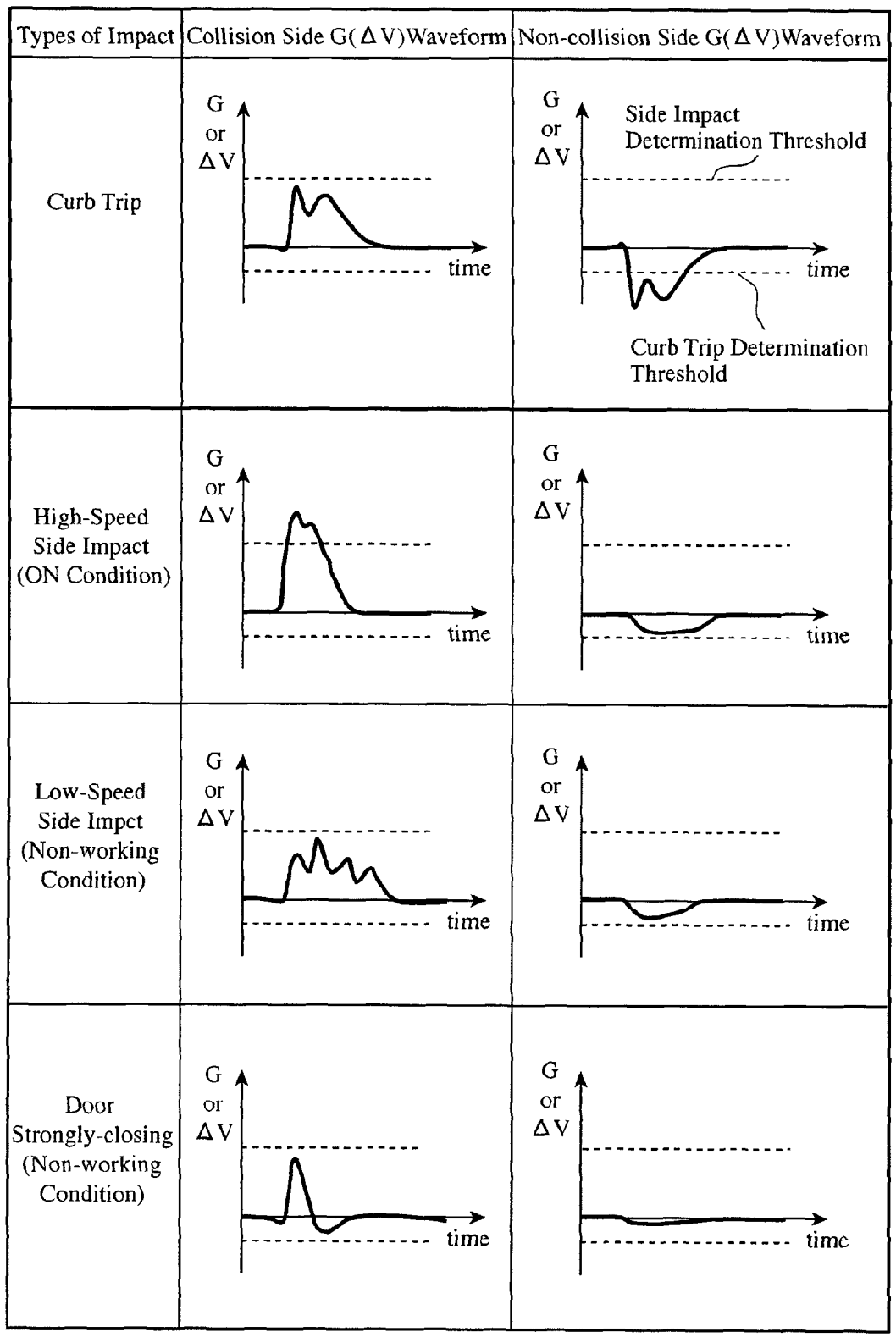
FIG. 3 is an explanatory table showing the relations among the types of impacts delivered to the side of a vehicle, the waveforms of detected acceleration (velocity change), and the determination threshold, in accordance with the first embodiment of the invention.

FIG. 3 shows the relations among the types of impacts delivered to the sides of a vehicle, the waveform of detected acceleration (velocity change), and the determination threshold. The accelerations G (or the velocity change ΔV) are detected as positive and negative values that are opposite in polarity between the side impact sensor (12 in the example of FIG. 2) on the collision side and the side impact sensor (13 in the example of FIG. 2) on the non-collision side. Moreover, the acceleration G (the velocity change ΔV) due to the impact at the time of the curb trip is substantially the same value on the collision and non-collision sides; however, the impacts of the other types are attenuated, the magnitudes thereof detected on the non-collision side are considerably small as compared with those detected on the collision side, and further, the magnitudes thereof detected on the non-collision side are also small as compared to the magnitude at the time of the curb trip.

In the left side-impact determination section 121 and right side-impact determination section 131, the side-impact determination threshold is set to a value larger than the detection value at the time of curb trips, as well as the values detected at the time of low-speed side-impacts and door strongly-closed events that are non-operating conditions of the prevention system. The side-impact determination threshold is equivalent to the set value that is used in the prior art. On the other hand, in the right curb trip determination section 122 and left curb trip determination section 132, the curb trip determination threshold is set with respect to a detection value with a negative polarity, and the absolute value thereof is set to a value larger than the absolute value of a detection value with a negative polarity caused by impacts of the types other than the curb trip. The curb trip determination threshold is set with respect to the acceleration value or velocity change value at the time of a collision that may lead to a curb trip and accompanied by a velocity change over the entire vehicle, and the value thereof has only to be set after a simulation or measured test of the curb trip is carried out.

Next, the operation of the configuration in FIG. 1 will be described.

For example, it is assumed that the case where an impact by a collision is delivered to the left side of the vehicle 10. In this case, the value detected and outputted by the side impact sensor 12 on the left side is fed to the processor 120, is subjected to filter (LPF) processing and integration processing therein, and then is sent to the left side-impact determination section 121 as the acceleration G (or velocity change ΔV) waveform (of positive polarity) on the collision side as shown in FIG. 3. The left side-impact determination section 121, when the inputted acceleration G (or the velocity change ΔV) is beyond the left side-impact determination threshold, determines that the impact is a high-speed side-impact, outputs an activation signal to the left occupant protection system 140 such as the side airbag 14, curtain airbag 16, or seatbelt pretensioner 18, and thereby activates the occupant protection system 140. Accordingly, the occupant can be protected from the left side-impact. In contrast, when the acceleration G (or the velocity change ΔV) is not beyond the left side-impact determination threshold, the side-impact determination section 121 determines that the impact is a low-speed impact or door strongly-closed case corresponding to non-operating conditions of the protection system, and does not output any working signals.

The aforementioned operation has been conventionally implemented against the side impact; however, should a collision reaching a curb trip exert an acceleration equivalent to that of the side impact at a high speed to the side impact sensor 12 on the left side, the left occupant protection system 140, of course, will be activated.

Further, at that time, in the right side-impact sensor 13, a detection output or value in the polarity opposite from that of the side impact sensor 12 is sensed to be sent to the processor 130. The processor 130 provides the acceleration G (or the velocity change ΔV) waveform of a negative polarity (the polarity opposite from the side-impact determination) on the non-collision side in FIG. 3, which is an operation result, to the left curb trip determination section 132. The left curb trip determination section 132, when the input acceleration G (or the velocity change ΔV) exceeds the left curb trip determination threshold, determines that the impact is a left curb trip, outputs a working signal to the left occupant protection system 140 such as the side airbag 14, curtain airbag 16, or seatbelt pretensioner 18, and activates the occupant protection system 140. Accordingly, it is possible to protect the occupant on the left side against the rollover. On the other hand, when the acceleration G (or the velocity change ΔV) does not exceeds the left curb trip determination threshold, the left curb trip determination section 132 determines that the impact is not a left curb trip, and does not output any working signals.

With respect to a curb trip, the occupant protection system has only to be worked by the time when the side windshield is broken and the occupant is thrown out of the vehicle (containing being partially and completely thrown therefrom) because of the rollover. Since there is a margin in time (around several tens of milliseconds) in the curb trip determination therefor as compared with that in the side impact determination (around several milliseconds), even when the side impact sensor on the non-collision side is used, a determination can be made at a proper timing and the occupant protection system can be activated at a right time.

In the above description, though the operations against the impacts from the left side are mentioned, it should be understood that the operations against the impacts from the right side can be similarly carried out.

As mentioned above, according to the first embodiment, the occurrence of a curb trip on the right side, e.g., is determined depending on whether or not the value (acceleration or velocity change) detected and outputted by an acceleration sensor disposed on the opposite side (left side) exceeds the curb trip determination threshold; when the occurrence of a curb trip is determined, the occupant protection system disposed on the vehicle side that is opposite (on the right side) from the position of the acceleration sensor generating the corresponding value is configured to be activated. Therefore, in the case that an acceleration sensor of the same type as that of a side impact sensor typically used is employed, by simply deciding the installation position thereof and setting the determination threshold, a discrimination in a proper timing on the velocity changes caused over the entire vehicle body such as a curb trip can be carried out to thus protect the occupant thereon. In particular, in the case that the acceleration sensor is shared with the side impact sensor as in the above-described example, even when the occupant protection system cannot be activated against a curb trip since the determination to the detection value of positive polarity from the side impact sensor on the side where the impact is applied is put in a "non-working condition", the protection system can be activated by using the detection value of opposite polarity from the other side impact sensor on the side opposite therefrom. Thus, the structure of the system can be simplified.

It should be noted that in the above example the explanation is given in the manner where the right occupant protection system is activated with respect to the right curb trip determination, while the left occupant protection system is activated to the left curb trip determination; however, with respect to the right or left curb trip determination, the occupant protection systems on both sides can be activated at the same time; it is also intended that the present invention cover such a case.

Second Embodiment

Figure 4:
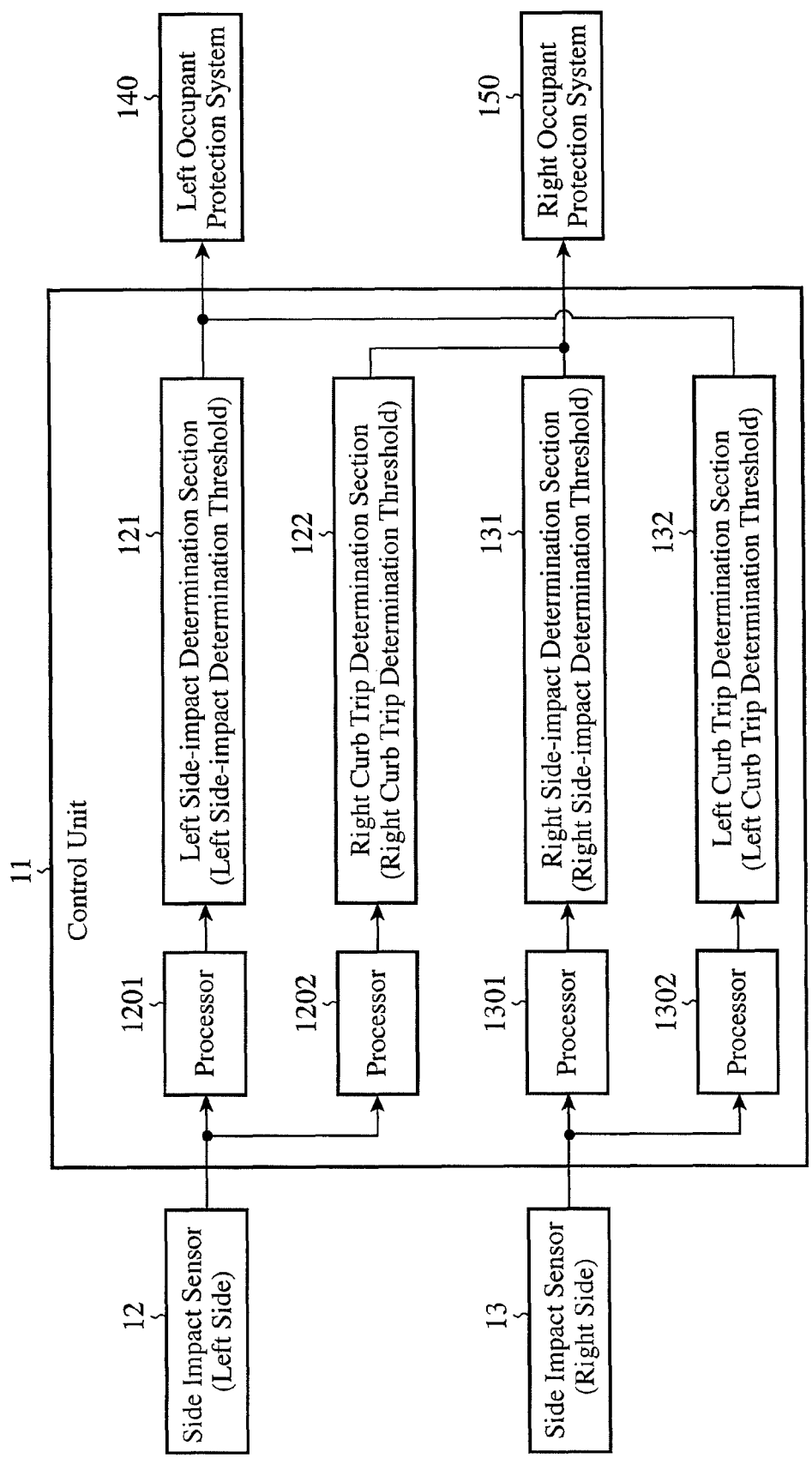
FIG. 4 is a block diagram illustrating another functional configuration of an activation apparatus for an occupant protection system in accordance with a second embodiment of the invention.

FIG. 4 illustrates another functional configuration of an activation apparatus for an occupant protection system according to a second embodiment of the present invention.

A processor 1202 performs arithmetic processing such as filter processing and integration processing only on the acceleration of the reversed polarity detected by the side impact sensor 12, sends the operation results to the right curb trip determination section 122, and the right curb trip determination section makes a determination based on the right curb trip determination threshold. Further, a processor 1302 performs operations such as filter processing and integration processing only on the acceleration of the reversed polarity detected by the side impact sensor 13, sends the operation results to the left curb trip determination section 132, and the left curb trip determination section makes a determination based on the left curb trip determination threshold.

In this connection, in the processing of the configuration in FIG. 4, it may be arranged that the values detected and outputted by the sensors be reversed in polarity by the processors 1202, 1302 and thereby, the operation results having the normal polarity be obtained as in the case of side impact determination. In that case, the thresholds of the right curb trip determination section 122 and left curb trip determination section 132 will be set to the values of the same polarity as that of the side-impact determination.

As mentioned above, according to the second embodiment, the arithmetic processing for the curb trip determination is arranged to be performed separately from the processing carried out by the processing system of the side-impact determination, and thus the optimum arithmetic processing for the curb trip determination can be employed.

It should be appreciated that also in the above example the right occupant protection system is activated to the right curb trip determination, while the left occupant protection system is activated to the left curb trip determination; in addition to those operations, with respect to the right or left curb trip determination the occupant protection systems can be activated on both the sides thereof at the same time.

Third Embodiment

In the above-mentioned first embodiment, the threshold used for the curb trip determination is set with respect to the acceleration value or velocity change value at the time of a collision leading to a curb trip and accompanied by a velocity change over the entire vehicle; in fact, the threshold value is set after a simulation or measured test of a curb trip is carried out. However, such a case that a vehicle leads to overturning though the detection value of reversed polarity detected by a side impact sensor is insufficient to exceed the determination threshold, that is, the possibility that a vehicle overturns in spite of a small impact is also actually supposable. Therefore, it is necessary to activate an occupant protection system with reliability even in such a situation. For this reason, according to the third embodiment, it is suggested that the following countermeasures are arranged therein.

First, an angular velocity sensor or an angle sensor detecting the inclining movement of the vehicle is provided at an appropriate place on a vehicle. Further, it is schemed that the rollover angular velocity and rollover angle of the vehicle be calculated based on the output from the angular velocity sensor or the angle sensor to change the above-described determination threshold based on these values. In such a way, when the possibility leading to a rollover event is high despite the small value detected by the side impact sensor, the value detected by the impact sensor exceeds the determination threshold changed to a lowered value, and thus, the occupant protection system can be activated according to the situation.

Moreover, for another method using an angular velocity sensor or an angle sensor, it is configured that the multiplication result obtained by multiplying the calculated rollover angular velocity and rollover angle of a vehicle by the weighting coefficient is added to the value outputted from the acceleration sensor. In this way, when the possibility leading to a rollover is high in spite of the fact that the value detected by the side impact sensor is small, the value detected by the impact sensor to which the additional value is added can exceed the determination threshold, and thus the occupant protection system can be activated according to the situation.

INDUSTRIAL APPLICABILITY

As mentioned above, the activation apparatus for the occupant protection system according to the present invention is arranged such that when an acceleration sensor is provided on the non-collision side of a vehicle, a threshold is set with respect to the value detected and outputted by the sensor; thereby, even in a case where an impact is delivered to a wheel portion thereof like a curb trip, the activation apparatus enables to work the occupant protection system at an appropriate timing, which is suitable for use in, e.g., activation apparatuses detecting the possibility of vehicle's rollover and thereby activating a side airbag and so on.

The invention claimed is:

1. An activation apparatus for an occupant protection system comprising:
   right and left acceleration sensors which are disposed on respective right and left sides of a vehicle with respect to a center thereof on the vehicle and each of the right and left sensors is used for determining an acceleration for a side opposite from the side where the each of the right and left sensors is disposed; and
   a determining unit determining whether or not the occupant protection system is to be activated by comparing a physical quantity computed based on a value detected and outputted by the right or left acceleration sensor with a threshold for activating the occupant protection system.

2. The activation apparatus for an occupant protection system according to claim 1, wherein the threshold for activating an occupant protection system is caused to change based on a rollover angular velocity or rollover angle of the vehicle calculated based on an output from an angular velocity sensor or an angle sensor installed in the vehicle.

3. The activation apparatus for an occupant protection system according to claim 1, wherein a rollover angular velocity or rollover angle of the vehicle is calculated based on an output from an angular velocity sensor or an angle sensor installed in the vehicle,
   a value is obtained by multiplying the calculated rollover angular velocity or rollover angle by a weighting coefficient, and
   the obtained value is added to the output value from the right or left acceleration sensor.

4. The activation apparatus for an occupant protection system according to claim 1, wherein at least one of the right and left acceleration sensors is used to make an activation determination for a side opposite from the side where the at least one of the right and left sensors is disposed.

5. The activation apparatus for an occupant protection system according to claim 1, wherein the threshold is set to an acceleration value or velocity change value upon a collision accompanied by a velocity change over the vehicle.

6. The activation apparatus for an occupant protection system according to claim 5, wherein the threshold is set to a maximum value in a non-rollover mode of the vehicle and when a computed value exceeds the threshold, the occupant protection system is activated assuming that the vehicle overturns.

7. The activation apparatus for an occupant protection system according to claim 1, wherein the occupant protection system is constructed of either or both of a curtain airbag and a side airbag in combination with a seatbelt pretensioner.

* * * * *